United States Patent
Hodgkins et al.

(10) Patent No.: US 12,312,246 B2
(45) Date of Patent: May 27, 2025

(54) METHOD FOR MANUFACTURE OF ZEOLITE MORDENITE IN THE PRESENCE OF ODSO

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 556 days.

(21) Appl. No.: 17/720,012

(22) Filed: Apr. 13, 2022

(65) Prior Publication Data

US 2023/0331566 A1    Oct. 19, 2023

(51) Int. Cl.
*C01B 39/26* (2006.01)

(52) U.S. Cl.
CPC .................. *C01B 39/265* (2013.01)

(58) Field of Classification Search
CPC ........ C01B 39/023; C01B 39/04; C01B 39/02
See application file for complete search history.

(56) References Cited

U.S. PATENT DOCUMENTS

| | | |
|---|---|---|
| 3,313,594 A | 4/1967 | Wilson |
| 3,516,786 A | 6/1970 | Maher et al. |
| 3,556,725 A | 1/1971 | Chiola et al. |
| 5,763,720 A | 6/1998 | Buchanan et al. |
| 5,951,962 A | 9/1999 | Müller et al. |
| 6,337,063 B1 | 1/2002 | Rouleau et al. |
| 7,923,522 B2 | 4/2011 | Hamada et al. |
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 11,111,212 B2 | 9/2021 | Koseoglu et al. |

FOREIGN PATENT DOCUMENTS

| | | |
|---|---|---|
| CN | 102452663 A | 5/2012 |
| CN | 103055933 A | 4/2013 |
| CN | 106145134 A | 11/2016 |
| CN | 107982540 A | 5/2018 |
| EP | 0999183 B1 | 6/2003 |
| WO | 2018202468 A1 | 11/2018 |

OTHER PUBLICATIONS

Fangxia Feng and Kenneth J. Balkus Jr, Direct Synthesis of ZSM-5 and Mordenite Using Poly(ethylene glycol) as a Structure-Directing Agent, Oct. 10, 2003, Journal of Porous Materials 10: 235-242 (Year: 2003).*

(Continued)

*Primary Examiner* — Daniel C. McCracken
*Assistant Examiner* — Joshua Maxwell Speer
(74) *Attorney, Agent, or Firm* — Leason Ellis LLP

(57) ABSTRACT

The present disclosure is directed to a method of manufacture of mordenite zeolites. This is accomplished by using an improved sol-gel formulation including a water-soluble fraction of ODSO as an additional component. The resulting products are, or contain, mordenite zeolites, with increased yield.

20 Claims, 4 Drawing Sheets

(56) References Cited

OTHER PUBLICATIONS

Grabicka et al. "Microwave-assisted synthesis of periodic mesoporous organosilicas with ethane and disulfide groups." Microporous and mesoporous materials 119.1-3 (2009): 144-149.

Jin et al. "Gold nanoparticles stabilized in a novel periodic mesoporous organosilica of SBA-15 for styrene epoxidation." Microporous and mesoporous materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

\* cited by examiner

METHOD FOR MANUFACTURE OF ZEOLITE MORDENITE IN THE PRESENCE OF ODSO

FIELD OF THE DISCLOSURE

The present disclosure relates to methods of making zeolites.

BACKGROUND OF THE DISCLOSURE

Zeolites (MOR)

Zeolites are crystalline solids possessing well-defined structures and uniform pore sizes that can be measured in angstroms (Å). Typically, zeolites comprise framework atoms such as silicon, aluminum and oxygen arranged as silica and alumina tetrahedra. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others.

Zeolites can also possess an acidity level that enhances its efficacy as a catalytic material or adsorbent, alone or with the addition of active components. In particular, highly acidic zeolites in the hydrogen-exchanged form are useful, including zeolite mordenite (MOR) (where MOR is the code established by the International Zeolite Association).

Zeolite mordenite comprises the MOR framework having a micropore size related to the 12-member rings when viewed along the [001] direction of 6.5×7.0 Å, respectively. The MOR framework contains five-membered rings linked laterally to form a three-dimensional structure with the 12-member rings connected in one direction by 8-member rings.

Numerous methods have been reported for the synthesis of zeolite mordenite, including in the absence or presence of a structure directing agent.

ODSO

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream co-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce mordenite zeolites, there remains a need in the art for improved methods to produce zeolite materials, in particular using DSO by-products in an economically and environmentally friendly manner. It is in regard to these and other problems in the art that the present disclosure is directed to provide a technical solution for an effective method of manufacturing mordenite zeolites.

SUMMARY OF THE DISCLOSURE

A method for the preparation of mordenite zeolite having a MOR framework is provided. The method comprises: forming a homogeneous aqueous mixture of water, a silica source, an aluminum source, an alkali metal source, an optional structure directing agent, and an effective amount of water-soluble oxidized disulfide oil (ODSO); and heating the homogeneous aqueous mixture under conditions and for a time effective for hydrolysis and to form a crystalline zeolite as precipitate suspended in a supernatant, wherein the precipitate contains mordenite zeolite. In certain embodiments, the precipitate is recovered and calcined at a suitable temperature, temperature ramp rate and for a suitable period of time to realize porous mordenite zeolite.

In certain embodiments, a cumulative amount of ODSO and water is approximately equivalent to an amount of water that is effective to produce beta zeolite in the absence of ODSO; the cumulative amount of ODSO and water, an amount of the silica source, an amount of the aluminum source, an amount of the alkali metal source, and an amount of the optional structure directing agent are provided at an ODSO-enhanced compositional ratio; the ODSO-enhanced compositional ratio is approximately equivalent to a baseline compositional ratio of water, silica source, aluminum source, alkali metal source and optional structure directing agent, the baseline compositional ratio being effective to produce beta zeolite in the absence of ODSO; and the conditions and time of heating are approximately equivalent to those that are effective to produce beta zeolite in the absence of ODSO. In certain embodiments, the effective amount of ODSO is greater than an amount of ODSO that produces only zeolite beta, and less than an amount of ODSO that produces only amorphous material and/or other crystalline material. In certain embodiments, the alkali metal source is sodium and the mass ratio of ODSO to sodium is in the range of about 2.2-7.1.

In certain embodiments, the ODSO is derived from oxidation of disulfide oil compounds present in an effluent refinery hydrocarbon stream recovered following catalytic oxidation of mercaptans present in a mercaptan-containing hydrocarbon stream. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are C1-C10 alkyl or C6-C10 aryl groups. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are C1-C10 alkyl or C6-C10 aryl groups. In certain embodiments, the ODSO compounds have 3 or more oxygen atoms and include one or more compounds selected from the group consisting of (R—SOO—SO—R'), (R—SOO—SOO—R'), (RSO—SOO—OH), (R—SOO—SOO—OH), (R—SO—SO—OH), (R—SOO—SO—OH), wherein R and R' are C1-C10 alkyl or C6-C10 aryl groups. In certain embodiments, the silica-to-alumina ratio (SAR) in the zeolite product is between about 10 and 10000.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
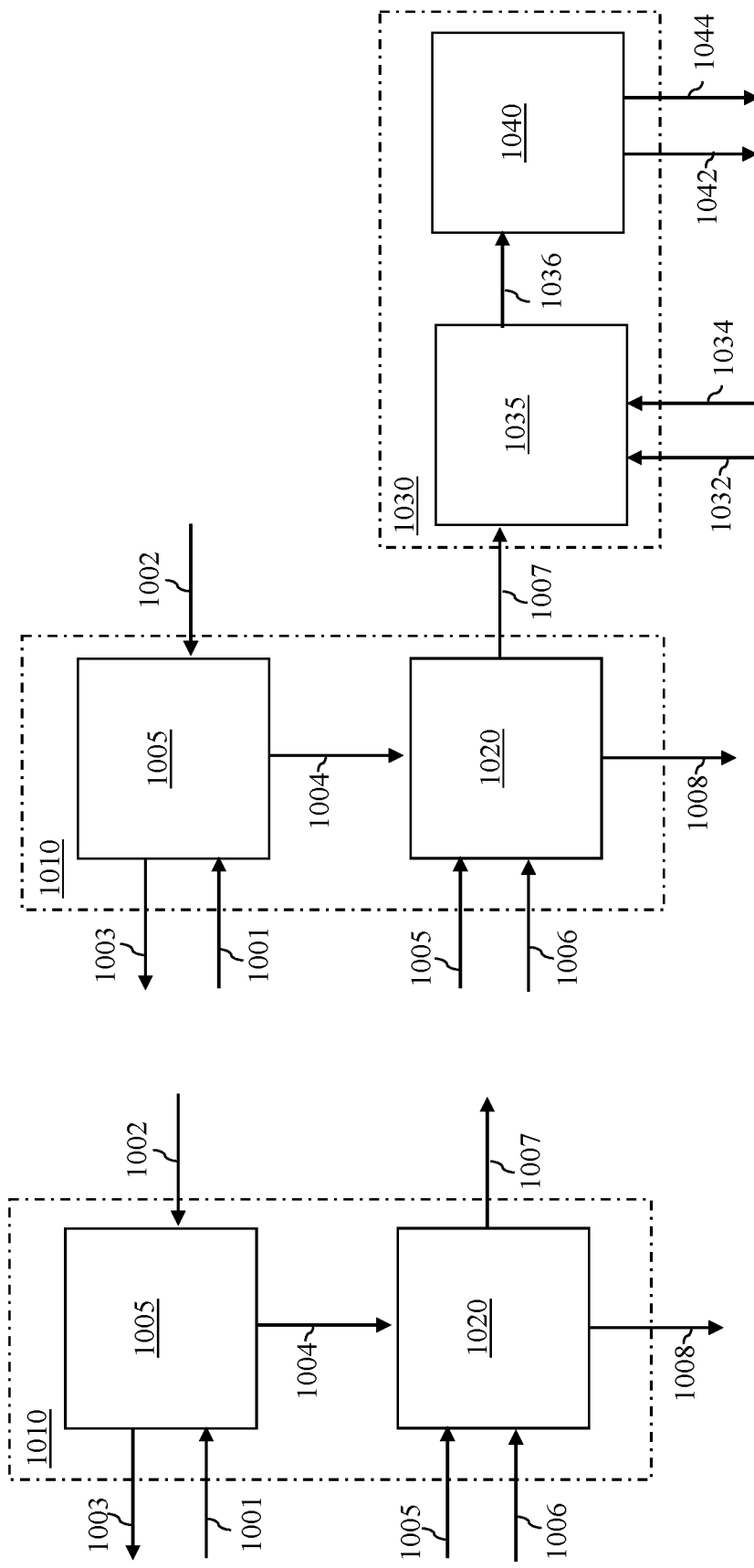
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

The present disclosure is directed to a method of manufacture of mordenite zeolites. This is accomplished by using an improved sol-gel formulation including a water-soluble fraction of ODSO as an additional component. The resulting products are, or contain, zeolite mordenite, whereas in the absence of the ODSO, the resulting products are beta zeolite. In certain embodiments overall zeolite yield is increased.

In conventional zeolite synthesis, water is used as an aqueous medium and as a solvent. In the embodiments of the present disclosure, an effective amount of water-soluble ODSO compounds is added as an additional component within the homogeneous aqueous mixture. In certain embodiments the homogeneous aqueous mixture is one that produces *BEA (beta) zeolite in the absence of ODSO. In certain embodiments, the ODSO is derived from a sulfur-containing refinery waste stream and is used as an additional component for the synthesis of mordenite zeolites.

In certain embodiments, when compared with an equivalent water-only synthesis that is conventional in the sol-gel synthesis of beta zeolite, inclusion of an ODSO component to the homogeneous aqueous mixture results synthesis of zeolite mordenite. In addition, in certain embodiments there is an increase in the overall zeolite. For example, compared with an equivalent water-only synthesis for beta zeolite, the use of the ODSO compounds in the syntheses herein increases the overall zeolite yield by about 1-60, 1-50, 10-60 or 10-50 mass %.

In certain embodiments the zeolites formed herein, the content of zeolite mordenite is in the range of about 0.1-100, 1-100, 5-100, 10-100, 25-100, 50-100, 75-100 or 90-100 mass % (wherein the mass % of zeolite mordenite to the combined product mass of zeolite mordenite and any other amorphous or crystalline products that are formed). The remainder (if the product is not 100% zeolite mordenite) can be beta zeolite, amorphous materials, or other unidentified crystalline materials. The synthesized zeolite mordenite has a crystal lattice constant of a=1.80 nm to 1.85 nm, b=2.02 nm to 2.08 nm and c=0.73 nm to 0.78 nm.

Synthesis Steps

Methods for the preparation of mordenite zeolites are provided. Effective amounts of precursors and reagents are formed as a homogeneous aqueous mixture, including a water source, an aluminum source, a silica source, an alkali metal source, and an optional structure directing agent. In the place of a certain amount of water, an effective amount of water-soluble ODSO is used as an additional component. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate (product) suspended in a supernatant (mother liquor). The precipitate is recovered, for example by filtration, washing and drying, as mordenite zeolite. In certain embodiments the recovered product is calcined at a suitable temperature, temperature ramp rate and for a suitable period of time to realize porous mordenite zeolite.

An effective amount of water for the aqueous environment and as a solvent during the sol-gel process can be provided from one or more water sources, including utility water that is added to form the homogeneous aqueous mixture, a water-containing silica source such as colloidal silica, an aqueous mixture of an aluminum oxide source, an aqueous mixture of an alkali metal source, and/or an aqueous mixture of an optional structure directing agent. The mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In certain embodiments, a homogeneous aqueous mixture is formed by: providing a silica source; combining an aluminum oxide source, an alkali metal source and an optional structure directing agent; and combining an effective amount of water-soluble ODSO. Alternatively, the water-soluble ODSO is combined with the aluminum oxide source, the alkali metal source and the optional structure directing agent, and that mixture is combined with the silica source.

In certain embodiments, a homogeneous aqueous mixture is formed by: providing an aluminum oxide source, an alkali metal source and an optional structure directing agent as a mixture; combining a silica source; and combining an effective amount of water-soluble ODSO. Alternatively, the water-soluble ODSO is combined with the silica source, and that mixture is combined with the aluminum oxide source, the alkali metal source and the optional structure directing agent.

In certain embodiments, a homogeneous aqueous mixture is formed by: forming an aqueous solution of an aluminum source, an alkali metal source and an optional structure directing agent; adding to the aqueous solution an effective amount of water-soluble ODSO; adding a silica source, since addition of the silica source forms a thick gel. In other embodiments, all or a portion of an effective amount of water-soluble ODSO can be added to the silica source, and that mixture is added to an aqueous solution of an aluminum source, an alkali metal source and an optional structure directing agent.

In embodiments, a homogeneous aqueous mixture is formed by: combining an effective amount of water-soluble ODSO with a silica source to form a mixture; and that mixture is combined with an aluminum oxide source, an alkali metal source and an optional structure directing agent.

In certain embodiments, a homogeneous aqueous mixture is formed by: combining an effective amount of water-soluble ODSO with an aluminum oxide source, an alkali metal source and an optional structure directing agent to form a mixture; and that mixture is combined with a silica source.

A homogeneous aqueous mixture of an aluminum source, a silica source, an alkali metal source, water-soluble ODSO and an optional structure directing agent is formed from any of the above chronological sequences of component addition. The homogeneous aqueous mixture is heated under conditions and for a time effective to form a precipitate suspended in a supernatant, wherein the time and conditions are effective to realize the precipitate containing mordenite zeolite, which is recovered, for example by filtration, washing and drying. In certain embodiments the recovered precipitate is calcined at a suitable temperature, temperature ramp rate and for a suitable period of time realize porous mordenite zeolite.

It is to be appreciated by those skilled in the art that in certain embodiments effective baseline ratios for synthesis of zeolites including zeolite mordenite can be determined by empirical data, for instance summarized as phase boundary diagrams or other methodologies as is known in material synthesis. In an example disclose herein, the baseline ratios and conditions are effective, in the absence of ODSO, for synthesis of beta zeolite. It is also to be realized that according to certain embodiments of the process herein, inclusion of an ODSO component results in shifting the material type out of the phase boundary diagram from beta zeolite to zeolite mordenite, even at approximately equivalent baseline ratios. For instance, with certain baseline ratios for synthesis of beta zeolite, increasing amounts of ODSO added to the sol-gel system results in mordenite zeolite; a further increase results in co-crystallized beta zeolite and mordenite zeolite.

In certain embodiments, effective ratios of precursors and reagents for production of zeolites herein are within those known to produce templated aluminosilicate zeolites and can be determined by those of ordinary skill in the art. For example, effective amounts of silica and alumina precursors are provided to produce synthesized zeolite having a silica-to-alumina ratio (SAR) in the range of about 10-10000, 10-5000, 10-500, 10-100, 10-80, 50-10000, 50-5000, 50-1000, 50-500 or 50-100. In certain embodiments, baseline compositional ratios of the aqueous composition used to produce zeolites herein include (on a molar basis):

$SiO_2/Al_2O_3$: 10-100
$OH^-/SiO_2$: 0.05-1
$R/SiO_2$: 0-1.0
Alkali metal cation/$SiO_2$: 0.075-1.0
$H_2O/SiO_2$: 5-80 wherein R is the structure directing agent, and a level of 0 represents absence of the structure directing agent.

It is appreciated by those skilled in the art that these molar composition ratios can be expressed on a mass basis. In certain embodiments, an exemplary compositional ratio is approximately 30 $SiO_2$:1 $Al_2O_3$:5.5 $Na_2O$:15 TEA:750 $H_2O$ on a molar basis.

In the embodiments herein, ratios of components in homogeneous aqueous mixtures including ODSO are referred to as "ODSO-enhanced compositional ratios." In certain embodiments an ODSO-enhanced compositional ratio is one in which ODSO is included to replace an approximately equivalent mass of water in the homogeneous aqueous mixture, and wherein a cumulative mass of ODSO and water (ODSO+$H_2O$) is approximately equivalent to a mass of water that is effective to produce *BEA zeolites in the absence of ODSO. In certain embodiments: a baseline compositional ratio of the silica, aluminum, alkali metal, optional structure directing agent and water is known or determined to be is effective to produce *BEA zeolite in the absence of ODSO; an ODSO-enhanced compositional ratio is approximately equivalent to the baseline compositional ratio except for the substitution of ODSO for water on a mass basis; and wherein the conditions and time of heating the ODSO-enhanced sol-gel is approximately equivalent to those that are effective to produce *BEA zeolite in the absence of ODSO.

The aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides, aluminum alkoxides, aluminum wire and alumina gels. For example, suitable materials as aluminum sources include aluminum nitrate nonahydrate or other commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

The silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabot, and colloidal silica (LUDOX commercially available from Cabot).

Effective structure directing agents that can optionally be added include known or developed structure directing agents for producing zeolite mordenite. In certain embodiments, effective structure directing agents include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol.

In certain embodiments, effective structure directing agents include one or more of quaternary ammonium cation compounds, including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds. The cation can be paired with one or more of a hydroxide anion (for example, TPAOH or CTAOH), a bromide anion (for example, TPAB or CTAB), or an iodide anion.

In certain embodiments, other known structure directing agents for producing zeolite mordenite can be selected, including but are not limited to one or more of: mixed organic templates such as glycerol, ethylene glycol or polyethylene glycol; pyrrolidine-based mesoporogens; piperazine; 1,6-diaminohexane; diethylpiperidinium; or co-operative organic templates such as N,N,N-trimethyl-1,1-adamantammonium and 1,2-hexanediol.

In the disclosed process for synthesizing mordenite zeolites, crystallization can occur in the absence or presence of seed materials comprising zeolite mordenite. Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate zeolite crystallization.

A hydroxide mineralizer is included as the hydroxide derived from the alkali metal source from the Periodic Table IUPAC Group 1 alkaline metals (and/or from the hydroxide of any hydroxide-containing structure directing agent). For example these are selected from the group consisting of NaOH, KOH, RbOH, LiGH, CsOH and combinations thereof. In certain embodiments a Na-based hydroxide mineralizer is selected. Note that the alkali metal source is provide as a hydroxide, but in embodiments herein where the ratio is expressed based on the mass of the alkali, it is the metal itself. For instance, when the alkali is NaOH, the ODSO/Na ratio is determined by dividing the mass of the ODSO by the mass of the Na portion of NaOH, that is, about 57.5% of the NaOH mass. In certain embodiments the basic components from the hydroxide mineralizer source are provided in effective amounts so as to maintain the homogeneous mixture at a pH level of greater than or equal to about 9, for example in the range of about 9-14, 9-13, 10-14, 10-13, 11-14 or 11-13. It is appreciated that the overall pH is influenced by anions from the hydroxide mineralizer source, and in certain embodiments anions from other sources such as from an optional structure directing agent, an alumina source or a silica source. In certain embodiments hydroxide anions are provided as the mineralizer from an alkali metal source and a structure directing agent. In the process herein, the pH is reduced by the presence of ODSO, therefore, the quantity of the basic compound from one or more of the aforementioned sources can be adjusted accordingly to attain the requisite pH.

The mixing steps typically occur at ambient temperature and pressure (for instance about 20° C. and about 1 standard atmosphere), for a mixing time that sufficient to realize a homogeneous aqueous distribution of the components. In certain embodiments the homogeneous aqueous mixture can be aged before being subjected to subsequent hydrothermal treatment, for example for a period of about 0-24, 0-5, 0.5-24 or 0.5-5 hours. Hydrothermal treatment is carried out at a temperature in the range of about 70-180, 100-180, 120-180, 70-160, 100-160, 120-160 or 130-150° C., at atmospheric or autogenous pressure (from the sol-gel or from the sol-gel plus an addition of a gas purge into the vessel prior to heating), and for a time period within the range of about 0.1-8, 0.2-8, 0.1-7, 0.2-7, 0,1-6, 0.2-6, 0.1-5 or 0.2-5 days, to ensure crystallization and formation of a zeolite gel.

The products are washed, for example with water at a suitable quantity, for example at about twice the volume of the homogeneous aqueous mixture. The wash can be at a temperature of from about 20-80° C. at atmospheric, vacuum or under pressure. The wash can continue until the pH of the filtrate approaches about 7-9. The solids are recovered by filtration, for instance, using known techniques such as centrifugation, gravity, vacuum filtration, filter press, or rotary drums, and dried, for example at a temperature of up to about 110 or 150° C.

The conditions for calcination to produce zeolites herein can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

ODSO

Example embodiments of the present disclosure include the use of one or more ODSO compounds as additional components in a homogeneous aqueous mixture for zeolite synthesis. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In the process herein, an effective amount of one or more ODSO compounds are used in the synthesis of mordenite zeolite. In certain embodiments an effective amount can be based on an amount that attains a desired pH range. In certain embodiments an effective amount can be approximately equivalent to a reduction in the amount of water that is used in the homogeneous aqueous mixture compared to synthesis without ODSO. In certain embodiments an effective amount can be based on a ratio of ODSO to alkali metal. In certain embodiments a ratio of ODSO to alkali metal represents the amount of ODSO relative to the amount of the selected alkali metal on a mass/mass basis or a molar/molar basis. For example, if sodium is used the ratio is expressed as ODSO/Na on a mass/mass basis or a molar/molar basis. In certain embodiments, the effective amount of ODSO is that which results in a pH level of greater than or equal to about 9, for example in the range of about 9-14, 9-13, 10-14, 10-13, 11-14 or 11-13 in the homogeneous aqueous mixture. In certain embodiments, the effective amount of ODSO can be relative to the quantity of basic groups in the homogeneous aqueous mixture, such as OH$^-$, to attain a desired pH range, with basic group contributions from the alkali metal source or in certain embodiments from the alkali metal source and from a structure directing agent containing basic groups; such a ratio can be expressed on a molar basis or on a mass basis. In certain embodiments, the effective amount of ODSO is that which results in a product that is at least about 0.1 mass % zeolite mordenite. In certain embodiments in which the ratios of materials in the homogeneous aqueous mixture are suitable for production of zeolite beta in the absence of ODSO, the effective amount of ODSO is greater than that which produces 100 mass % beta zeolite. In certain embodiments in which the ratios of materials in the homogeneous aqueous mixture are suitable for production of zeolite beta in the absence of ODSO, beta zeolite is produced as a co-product, and the effective amount of ODSO is greater than that which produces 100 mass % beta zeolite and is greater than that which produces 100 mass % mordenite zeolite.

In certain embodiments, the ODSO compounds used as a component herein for zeolite synthesis are obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SOR'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are C1-C10 alkyl or C6-C10 aryl groups. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and a component used herein for zeolite synthesis comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments a component used herein for zeolite synthesis comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments a component used herein for zeolite synthesis comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments a component used herein for zeolite synthesis comprises, consists of or consists essentially of ODSO compounds selected from the group consisting of (R—SOO—SO—R'), (R—SOO—SOO—R"), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl groups. In certain embodiments, the R and R' are methyl and/or ethyl groups. In certain embodiments, the ODSO compound(s) used herein as a component for zeolite synthesis have 1 to 20 carbon atoms.

In certain embodiments, a component used herein for zeolite synthesis comprises, consists of or consists essentially of ODSO compounds having an average density greater than about 1.0 g/cc. In certain embodiments, a component used herein for zeolite synthesis comprises, consists of or consists essentially of ODSO compounds having an average boiling point greater than about 80° C. In certain embodiments, a component used herein for zeolite synthesis comprises, consists of or consists essentially of ODSO compounds having a dielectric constant that is less than or equal to 100 at 0° C.

Table 1 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as a component for zeolite synthesis comprise all or a portion of the ODSO compounds contained in an oxidation effluent stream that is obtained by controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as a component for zeolite synthesis are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4} O_2 \longrightarrow \tfrac{1}{2} RSSR + \tfrac{1}{2} H_2O \quad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R in the reaction. The reaction is then written:

$$2\ R'SH + 2\ RSH + O_2 \longrightarrow 2\ R'SSR + 2\ H_2O \quad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having endpoints above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and their combination. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-mono-sulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below example and data are exemplary. It is to be understood that other ratios and types of aluminum sources, silica sources, bases and structure directing agents can be used as compared to the example.

Figure 3A:
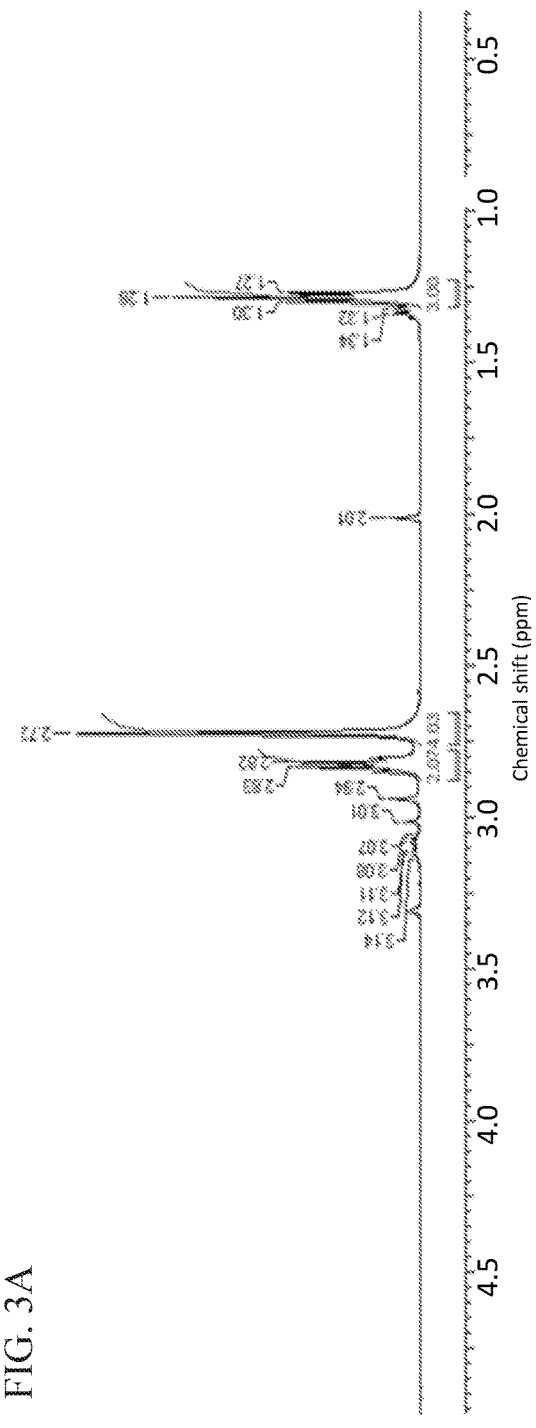
FIG. 3A is the experimental $^1$H-NMR spectrum of the polar, water-soluble ODSO fraction used in examples herein.
Figure 3B:
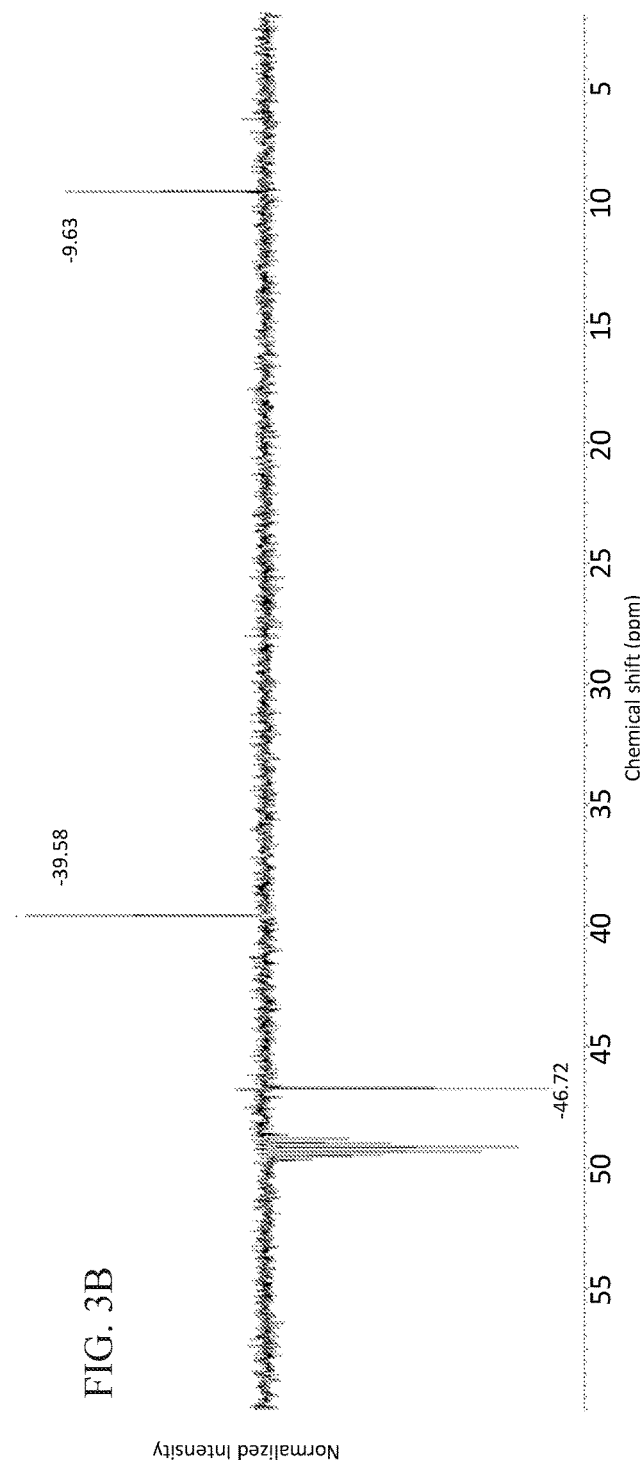
FIG. 3B is the experimental $^{13}$C-DEPT-135-NMR spectrum of the polar, water-soluble ODSO fraction used in examples herein.

Reference Example: The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.9. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form the ODSO composition used in the present examples.

Comparative Example: In a comparative example, zeolite beta was synthesized using conventional precursors and water as solvent, for instance with a sol-gel SAR of about 30. Aluminum nitrate nonahydrate (0.6955 g) was weighed into a polytetrafluoroethylene (PTFE) liner (45 ml). Thereafter, 0.8144 g of a 50 wt. % sodium hydroxide solution and 5.0878 g tetraethylammonium hydroxide (TEAOH, 40 wt. %) were added and the mixture stirred until the aluminum source dissolved. Next, distilled water (6.2386 g) was added and the mixture was kept under stirring. The silica source, (4.1737 g, 40 wt. %), was added and the mixture stirred until homogeneous. The PTFE liner was positioned within an autoclave and transferred to an oven and heated to a temperature of 140° C. whilst rotating the autoclave. The autoclave was kept at isothermal conditions for 6 days. Thereafter, the product was filtered and washed with distilled water before drying at 110° C. The dry mass was 1.1530 g. The inorganic content determined by thermogravimetric (TGA) analysis was 79.1%, which corresponds to a zeolite yield of 0.9119 g. The as-made sample was calcined at 550° C. (1° C./min ramp rate) for 8 hours to realize the porous zeolite.

Example 1: ODSO as described in the Reference Example was included in the homogeneous aqueous mixture to synthesize zeolite mordenite. As in the Comparative Example, precursors were used with a sol-gel SAR of about 30. Aluminum nitrate nonahydrate (0.6940 g) was weighed into a PTFE liner (45 ml). Thereafter, 0.8149 g of a 50 wt. % sodium hydroxide solution and 5.1046 g tetraethylammonium hydroxide (TEAOH, 40 wt. %) were added and the mixture stirred until the aluminum source dissolved. Next, distilled water (5.6084 g) and ODSO (0.6233 g) were added and the mixture was kept under stirring. Finally, the silica source, (4.1712 g, 40 wt. %), was added and the mixture stirred until homogeneous. The PTFE liner was positioned within an autoclave and transferred to an oven and heated to a temperature of 140° C. whilst rotating the autoclave. The autoclave was kept at isothermal conditions for 6 days. Thereafter, the product was filtered and washed with distilled water before drying at 110° C. The dry mass was 1.2196 g. The inorganic content determined by thermogravimetric (TGA) analysis was 85.6%, which corresponds to a zeolite yield of 1.0440 g, and is approximately a 14% increase in yield relative to the comparative example. The as-made sample was calcined at 550° C. (1° C./min ramp rate) for 8 hours to realize the porous zeolite.

Example 2: ODSO as described in the Reference Example was included in the homogeneous mixture to synthesize zeolite mordenite. As in the Comparative Example, precursors were used with a sol-gel SAR of about 30. Aluminum nitrate nonahydrate (0.6942 g) was weighed into a PTFE liner (45 ml). Thereafter, 0.8144 g of a 50 wt. % sodium hydroxide solution and 5.1047 g tetraethylammonium hydroxide (TEAOH, 40 wt. %) were added and the mixture stirred until the aluminum source dissolved. Next, distilled water (5.2990 g) and ODSO (0.9334 g) were added and the mixture was kept under stirring. Finally, the silica source, (4.1705 g, 40 wt. %), was added and the mixture stirred until homogeneous. The PTFE liner was positioned within an autoclave and transferred to an oven and heated to a temperature of 140° C. whilst rotating the autoclave. The autoclave was kept at isothermal conditions for 6 days. Thereafter, the product was filtered and washed with distilled water before drying at 110° C. The dry mass was 1.3032 g. The inorganic content determined by thermogravimetric (TGA) analysis was 85.8%, which corresponds to a zeolite yield of 1.1181 g, and is approximately a 23% increase in yield relative to the comparative example. The as-made sample was calcined at 550° C. (1° C./min ramp rate) for 8 hours to realize the porous zeolite.

Example 3: ODSO as described in the Reference Example was included in the homogeneous mixture to synthesize zeolite mordenite. As in the Comparative Example, precursors were used with a sol-gel SAR of about 30. Aluminum nitrate nonahydrate (0.6938 g) was weighed into a PTFE liner (45 ml). Thereafter, 0.8132 g of a 50 wt. % sodium hydroxide solution and 5.1084 g tetraethylammonium hydroxide (TEAOH, 40 wt. %) were added and the mixture stirred until the aluminum source dissolved. Next, distilled water (4.6674 g) and ODSO (1.5585 g) were added and the mixture was kept under stirring. Finally, the silica source, (4.1705 g, 40 wt. %), was added and the mixture stirred until homogeneous. The PTFE liner was positioned within an autoclave and transferred to an oven and heated to a temperature of 140° C. whilst rotating the autoclave. The autoclave was kept at isothermal conditions for 6 days. Thereafter, the product was filtered and washed with distilled water before drying at 110° C. The dry mass was 1.6196 g. The inorganic content determined by thermogravimetric (TGA) analysis was 86.2%, which corresponds to a zeolite yield of 1.3961 g, and is approximately a 53% increase in yield relative to the comparative example. The as-made sample was calcined at 550° C. (1° C./min ramp rate) for 8 hours to realize the porous zeolite.

Figure 4:
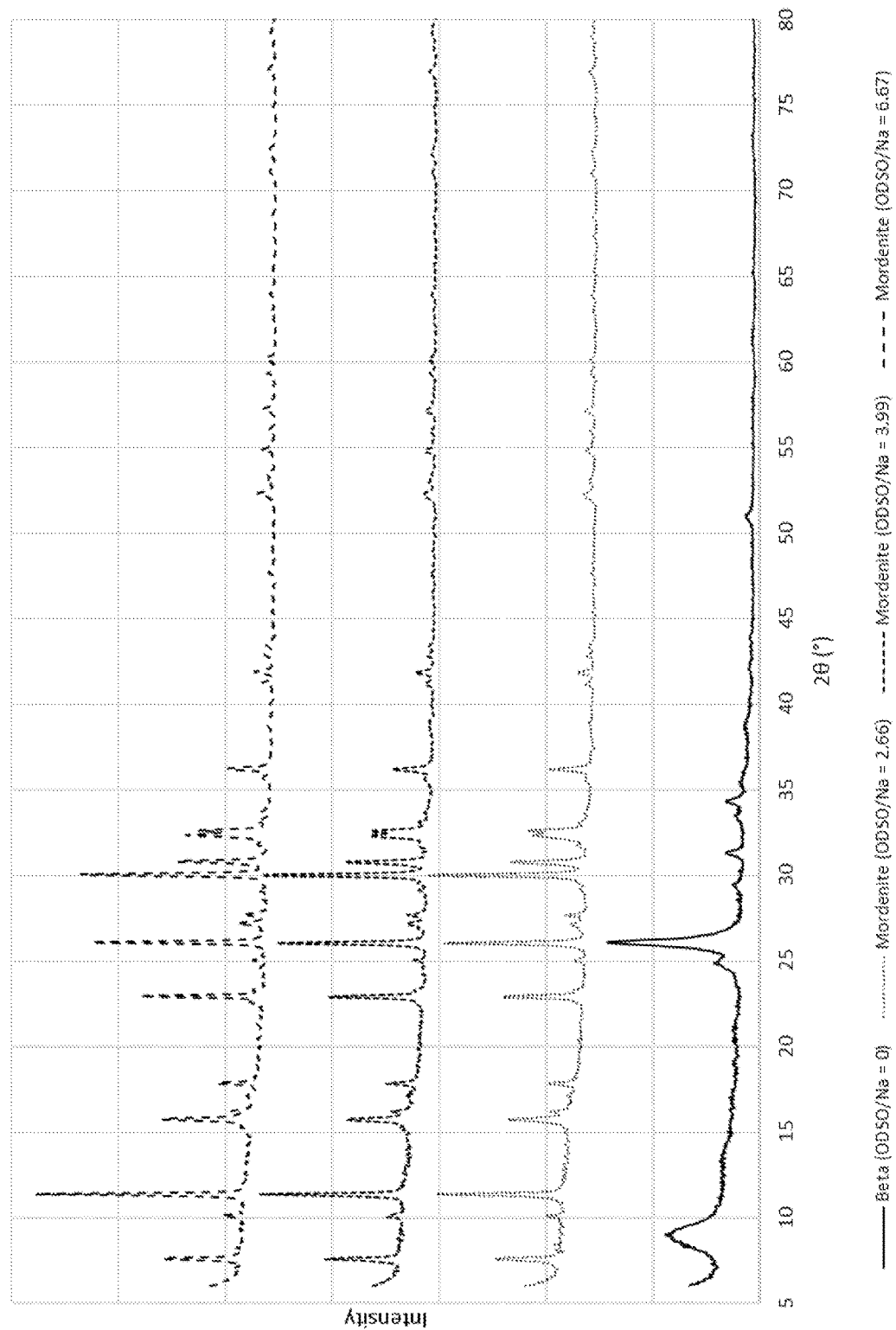
FIG. 4 shows X-ray diffraction patterns of mordenite zeolites synthesized using ODSO as in examples herein compared with beta zeolite synthesized in the absence of ODSO as in a comparative example herein.

FIG. 4 shows X-ray diffraction patterns of the as-made zeolites (prior to calcination) where each pattern is offset on the y-axis by an equivalent amount for clarity, which is an effective way to compare patterns relative to one another. The patterns for samples using ODSO clearly show presence of zeolite mordenite, while the comparative example shows zeolite beta.

Table 2 identifies the structure of the product as a function of the ODSO content. Under approximately equivalent ratios of precursors/reagents, and under approximately equivalent synthesis process conditions, with ODSO/Na ratios that are higher than those for mordenite zeolite (for instance as in the examples herein), co-crystallized zeolite beta and zeolite mordenite is produced (wherein the ODSO/Na ratios are about 8 in the examples disclosed in commonly owned U.S. application Ser. No. 17/719,848 filed on Apr. 13, 2022, entitled "Method for Manufacture of Co-Crystallized Zeolite Beta and Zeolite Mordenite in the Presence of ODSO" which is incorporated by reference herein in its entirety). Under approximately equivalent ratios of precursors/reagents, and under approximately equivalent synthesis process conditions, with ODSO/Na ratios that are lower than those for zeolite mordenite as provided herein, zeolite beta is produced (wherein the ODSO/Na ratio is about 1.3 in the example disclosed in commonly owned US application 17,719,972 filed on Apr. 13, 2022, entitled "Method For Manufacture Of Zeolite Beta In The Presence Of ODSO" which is incorporated by reference herein in its entirety). Under approximately equivalent ratios of precursors/reagents, and under approximately equivalent synthesis process conditions, with ODSO/Na ratios that are higher than those for co-crystallized zeolite beta and zeolite mordenite (for instance at or above about 9.3), amorphous material and in some instances other unidentified crystalline material is produced. In certain embodiments of the present process for producing zeolite mordenite, an ODSO/Na mass ratio can be in the range of about 2.2-7.1, 2.2-6.9, 2.5-7.1 or 2.5-6.9. In certain embodiments, the effective amount of ODSO is expressed as ODSO/Na mass ratio ranges, which is calculated from a baseline compositional ratio of 30 $SiO_2$:1 $Al_2O_3$: 5.5 $Na_2O$:15 TEA:750 $H_2O$ on a molar basis. In the examples, approximately equivalent conditions, time and ratios were used, except that an approximately equivalent mass of water was replaced with ODSO and hence the ODSO-enhanced compositional ratios are approximately equivalent to the baseline compositional ratio for the Comparative Example.

It is also noted that the amount of sodium would be adjusted based on the anions in other sol-gel components. For instance, in the examples herein a portion of the sodium cations in the quantity of $Na_2O$ counterbalances nitrate anions that form the aluminum source (aluminum nitrate nonahydrate), for instance, 3 of the 5.5 moles of $Na_2O$ that are present in the compositional ratio counter the anions; with an aluminum source that does not include such anions or contains less anions, the required amount of sodium cations is reduced (for instance, if no anions are present in the aluminum source, an equivalent compositional ratio would include 2.5 moles of $Na_2O$).

Figure 5:
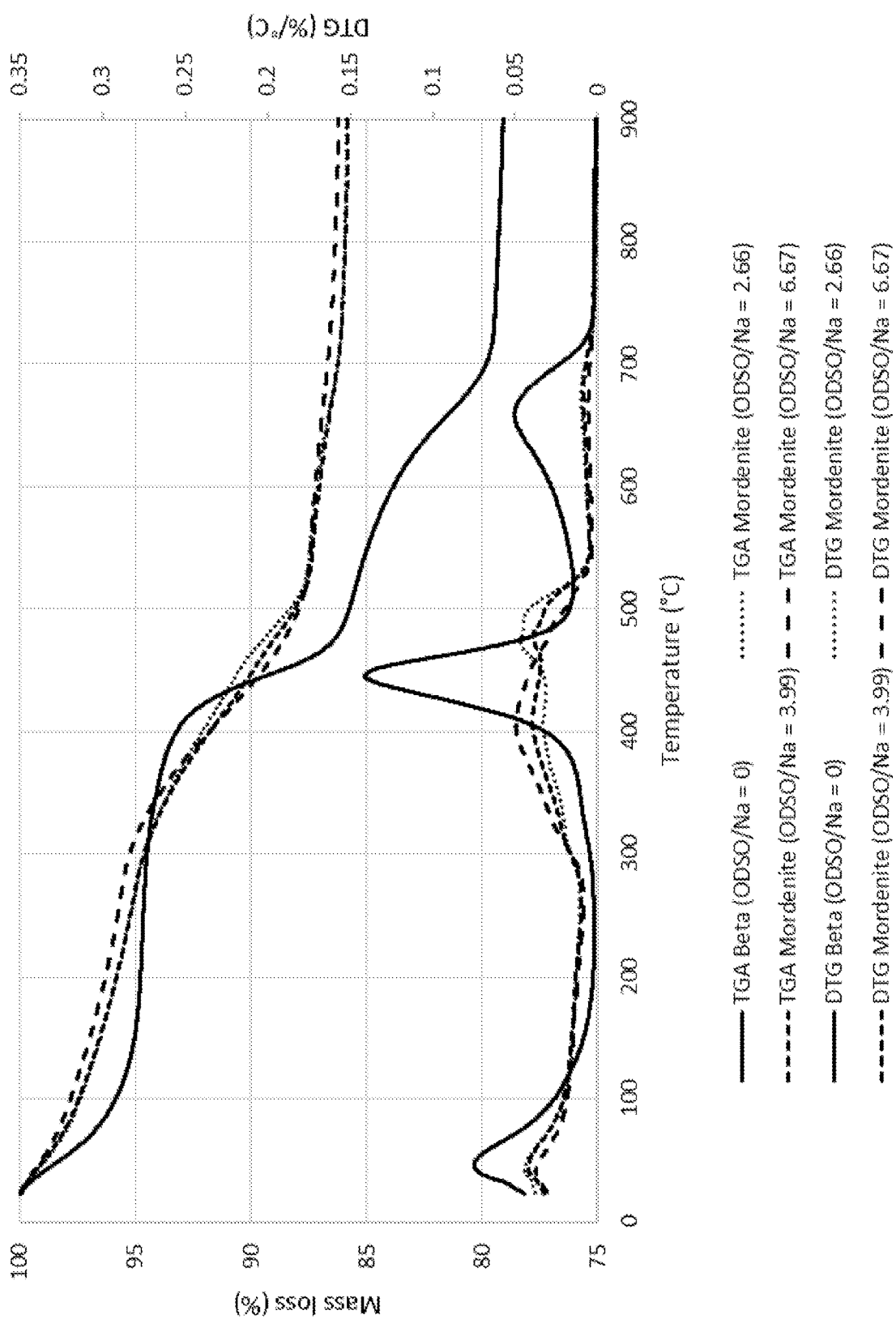
FIG. 5 is a plot of thermogravimetric (TGA) and derivative thermogravimetric (DTG) mass loss profiles of the mordenite zeolites synthesized in the presence of ODSO and water as in examples herein compared with beta zeolite synthesized in the absence of ODSO as in a comparative example herein.

FIG. 5 shows a thermogravimetric mass loss profile of the zeolite mordenite according to Examples 1-3 and the zeolite beta of the comparative example. Normalized zeolite yield is based on the dry mass of the as-made zeolite multiplied by the inorganic content determined from thermogravimetric analysis. An ODSO/Na ratio=0 is a water-only synthesis in the absence of ODSO. FIG. 5 and Table 2 demonstrate the increase in normalized yield as a function of the ODSO content.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
| --- | --- | --- |
| Dialkyl-sulfonesulfoxide Or 1,2-alkyl-alkyl-disulfane 1,1,2-trioxide | (R—SOO—SO—R') | 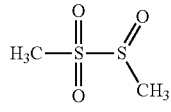 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 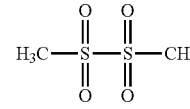 1,2-Dimethyldisulfane 1,1,2,2-tetraoxide |
| Alkyl-sulfoxidesulfonate | (R—SO—SOO—OH) | 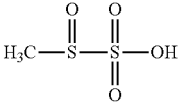 Methylsulfanesulfonic acid oxide |
| Alkyl-sulfonesulfonate | (R—SOO—SOO—OH) | 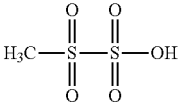 1-Hydroxy-2-methyldisulfane 1,1,2,2-tetraoxide |

TABLE 1-continued

| ODSO Name | Formula | Structure Examples |
|---|---|---|
| Alkyl-sulfoxidesulfinate | (R—SO—SO—OH) | $H_3C-\overset{O}{\underset{\|}{S}}-\overset{O}{\underset{\|}{S}}-OH$<br>1-Hydroxy-2-methyldisulfane 1,2-dioxide |
| Alkyl-sulfonesulfinate | (R—SOO—SO—OH) | $H_3C-\overset{O}{\underset{\overset{\|}{S}}{\underset{\|}{\overset{\|}{S}}}}-\overset{O}{\underset{\|}{S}}-OH$<br>Methylsulfanesulfinic acid dioxide |

R and R' can be the same or different C1-C10 alkyl or C6-C10 aryl.

TABLE 2

| ODSO/Na Ratio (w/w) | Water Substitution (w %)* | Product Structure | Normalized Yield |
|---|---|---|---|
| 0 | 0 | *BEA zeolite | 1.00 |
| 1.32 | 5 |  | 1.14 |
| 2.66 | 10 | MOR zeolite | 1.15 |
| 3.99 | 15 |  | 1.23 |
| 5.27 | 20 |  | 1.40 |
| 6.67 | 25 |  | 1.53 |
| 7.97 | 30 | *BEA/MOR zeolite | 1.74 |
| 9.30 | 35 | amorphous | 1.94 |
| 10.66 | 40 |  | 1.93 |
| 15.94 | 60 | amorphous plus | 1.76 |
| 21.35 | 80 | unknown crystalline | 1.62 |
| 26.46 | 100 | phase | 1.71 |

*Note
that the water substitution refers to the replacement of the utility water that is added to form the homogeneous aqueous mixture, and excludes water added from certain precursors/reagents.

What is claimed is:

1. A method for the preparation of mordenite zeolite having a MOR framework comprising:
   forming a homogeneous aqueous mixture of water, a silica source, an aluminum source, an alkali metal source, an optional structure directing agent, and a water-soluble oxidized disulfide oil (ODSO); and
   heating the homogeneous aqueous mixture under conditions and for a time effective for hydrolysis and to form a crystalline zeolite as precipitate suspended in a supernatant, wherein the precipitate comprises mordenite zeolite.

2. The method of claim 1, wherein the precipitate is recovered and calcined at a suitable temperature, temperature ramp rate and for a suitable period of time to realize porous mordenite zeolite.

3. The method of claim 1, wherein
   a cumulative amount of ODSO and water is approximately equivalent to an amount of water that is effective to produce beta zeolite in the absence of ODSO;
   the cumulative amount of ODSO and water, an amount of the silica source, an amount of the aluminum source, an amount of the alkali metal source, and an amount of the optional structure directing agent are provided at an ODSO-enhanced compositional ratio;
   the ODSO-enhanced compositional ratio is approximately equivalent to a baseline compositional ratio of water, silica source, aluminum source, alkali metal source and optional structure directing agent, the baseline compositional ratio being effective to produce beta zeolite in the absence of ODSO; and
   the conditions and time of heating are approximately equivalent to those that are effective to produce beta zeolite in the absence of ODSO.

4. The method as in claim 3, wherein the mordenite zeolite comprises at least about 0.1 mass % of the precipitate, and
   wherein the effective amount of ODSO is greater than an amount of ODSO that produces only zeolite beta, and less than an amount of ODSO that produces only amorphous material and/or other crystalline material.

5. The method as in claim 3, wherein the alkali metal source is sodium and the mass ratio of ODSO to sodium is in the range of about 2.2-7.1.

6. The method as in claim 1, wherein the ODSO is derived from oxidation of disulfide oil compounds present in an effluent refinery hydrocarbon stream recovered following catalytic oxidation of mercaptans present in a mercaptan-containing hydrocarbon stream.

7. The method as in claim 1, wherein the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R—SO—SO—OR), (R'—SOO—SO—OR), (R'—SO—SOO—OR) and (R'—SOO—SOO—OR), wherein R and R' can be the same or different C1-C10 alkyl or C6-C10 aryl.

8. The method as in claim 1, wherein the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH), (R'SO—SO—OR), (R'—SOO—SO—OR), (R'—SO—SOO—OR) and (R'—SOO—SOO—OR), wherein R and R' can be the same or different C1-C10 alkyl or C6-C10 aryl.

9. The method as in claim 1, wherein the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' can be the same or different C1-C10 alkyl or C6-C10 aryl.

10. The method as in claim 1, wherein the silica-to-alumina ratio (SAR) in the zeolite product is between about 10 and 10000.

11. The method as in claim 1, wherein the aluminum source is selected from the group consisting of aluminates, alumina, other zeolites, aluminum colloids, boehmites, pseudo-boehmites, aluminum hydroxides, aluminum salts, aluminum alkoxides, aluminum wire and alumina gels.

12. The method as in claim 1, wherein the silica source is selected from the group consisting of sodium silicate (water glass), rice husk, fumed silica, precipitated silica, colloidal silica, silica gels, zeolites, dealuminated zeolites, silicon hydroxides and silicon alkoxides.

13. The method as in claim 1, wherein the structure directing agent is used to stabilize the zeolite structure.

14. The method as in claim 13, wherein the structure directing agent is selected from the group consisting of quaternary ammonium ions, trialkylamines, dialkylamines, monoalkylamines, cyclic amines, alkylethanol amines, cyclic diamines, alkyl diamines, alkyl polyamines, alcohols, ketones, morpholine, and glycerol.

15. The method as in claim 13, wherein the structure directing agent comprises a cation selected from the group consisting of tetramethylammonium, tetraethylammonium, tetrapropylammonium, tetrabutylammonium, and cetyltrimethylammonium, paired with an anion selected from the group consisting of hydroxide, bromide and iodide.

16. The method as in claim 13, wherein the structure directing agent is selected from the group consisting of glycerol, ethylene glycol, polyethylene glycol, pyrrolidine-based mesoporogens, piperazine, 1,6-diaminohexane, diethylpiperidinium, N,N,N-trimethyl-1,1-adamantammonium and 1,2-hexanediol.

17. The method as in claim 1, wherein crystallization occurs in the absence of a seed.

18. The method as in claim 1, wherein crystallization occurs in the presence of a seed.

19. The method as in claim 1, wherein the pH of the homogeneous aqueous mixture is in the range from about 9-14.

20. The method as in claim 1, wherein the homogeneous aqueous mixture is formed by:
  (a) providing the silica source; and
    combining with the silica source the aluminum oxide source, the alkali metal source, the optional structure directing agent and the water-soluble ODSO;
    wherein the water-soluble ODSO is added after the aluminum oxide source, the alkali metal source, and the optional structure directing agent, or wherein the water-soluble ODSO is first combined with the aluminum oxide source, the alkali metal source and the optional structure directing agent, and then combined with the silica source;
  (b) providing the aluminum oxide source, the alkali metal source and the optional structure directing agent as a first mixture; and
    combining the first mixture with the silica source and the water-soluble ODSO;
    wherein the water-soluble ODSO is added after the silica source; or wherein the water-soluble ODSO is first combined with the silica source, and then combined with the first mixture;
  (c) combining the water-soluble ODSO with the silica source to form a first mixture; and
    combining the first mixture with the aluminum oxide source, alkali metal source and the optional structure directing agent;
  or
  (d) combining the water-soluble ODSO with the aluminum oxide source, the alkali metal source and the optional structure directing agent to form a first mixture; and
    combining the first mixture with the silica source;
  wherein an effective amount of water for the homogeneous aqueous mixture in (a)-(d) is provided by using utility water, a water-containing silica source, and/or by using an aqueous mixture of the aluminum oxide source, the alkali metal source and the optional structure directing agent.

* * * * *